(12) United States Patent
Jones et al.

(10) Patent No.: US 10,313,925 B2
(45) Date of Patent: Jun. 4, 2019

(54) LONG-RANGE VOICE AND DATA TRANSMISSION USING LORA MODULATION AND SENSITIVITY-ENHANCING BUFFERING TECHNIQUES

(71) Applicant: Beartooth Radio, Inc., Bozeman, MT (US)

(72) Inventors: Jefferson M. Jones, Bozeman, MT (US); Andrew M. Wade, Bozeman, MT (US); Nicholas G. Evans, Omaha, NE (US); Michael C. Monaghan, Bozeman, MT (US); Justin A. Hogan, Bozeman, MT (US)

(73) Assignee: Beartooth Radio, Inc., Bozeman, MT (US)

( * ) Notice: Subject to any disclaimer, the term of this patent is extended or adjusted under 35 U.S.C. 154(b) by 24 days.

(21) Appl. No.: 15/446,939

(22) Filed: Mar. 1, 2017

(65) Prior Publication Data

US 2017/0181033 A1 Jun. 22, 2017

Related U.S. Application Data

(63) Continuation-in-part of application No. 15/436,405, filed on Feb. 17, 2017, now Pat. No. 10,038,768.
(Continued)

(51) Int. Cl.
*H04W 28/06* (2009.01)
*H04B 17/318* (2015.01)
(Continued)

(52) U.S. Cl.
CPC .......... *H04W 28/06* (2013.01); *H04B 1/0003* (2013.01); *H04B 1/006* (2013.01);
(Continued)

(58) Field of Classification Search
CPC ....... H04W 28/06; H04W 4/008; H04W 4/80; H04W 52/245; H04W 64/00;
(Continued)

(56) References Cited

U.S. PATENT DOCUMENTS 6,091,765 A 7/2000 Pietzold, III et al.
6,131,040 A * 10/2000 Knuutila .............. H04B 1/3816
455/418

(Continued)

FOREIGN PATENT DOCUMENTS

GB 2350749 12/2000

OTHER PUBLICATIONS

Semtech Application Note, LoRa™ Modulation Basics, AN1200. 22, http://www.semtech.com/images/datasheet/an1200.22.pdf, 26 pages, May 2015.

*Primary Examiner* — Wutchung Chu
(74) *Attorney, Agent, or Firm* — Klarquist Sparkman LLP (57) ABSTRACT

Systems and methods are disclosed for extending the communication range of mobile communication devices. A long-range radio device is controlled by a control application on a host smartphone. The long-range radio device provides signal paths for two different radios, one employing a long-range (LoRa) modulation format, and another employing a high data-rate encoding such as FSK. The system provides graceful degradation in data rate as radio link distance increases and received signal strength decreases. In addition to switching between radios, variable compression and buffering are used to adapt usage to supportable data rates. Voice, other audio, video, text, binary, and other data formats are supported, as also a wide range of co-resident host apps. Unidirectional and bidirectional links can be used.

20 Claims, 7 Drawing Sheets

Related U.S. Application Data which is a continuation of application No. 14/645,171, filed on Mar. 11, 2015, now Pat. No. 9,614,573.

(60) Provisional application No. 62/302,086, filed on Mar. 1, 2016, provisional application No. 61/951,953, filed on Mar. 12, 2014.

(51) Int. Cl.

| | | |
|---|---|---|
| *H04W 64/00* | (2009.01) | |
| *H04L 27/10* | (2006.01) | |
| *H04B 1/69* | (2011.01) | |
| *H04W 52/24* | (2009.01) | |
| *H04L 1/00* | (2006.01) | |
| *H04W 76/14* | (2018.01) | |
| *H04W 4/80* | (2018.01) | |
| *H04B 1/00* | (2006.01) | |
| *H04B 1/3883* | (2015.01) | |
| *H04B 1/3888* | (2015.01) | |
| *H04B 1/48* | (2006.01) | |
| *H04M 1/725* | (2006.01) | |
| *H04W 88/04* | (2009.01) | |

(52) U.S. Cl.
CPC ......... *H04B 1/3883* (2013.01); *H04B 1/3888* (2013.01); *H04B 1/48* (2013.01); *H04B 1/69* (2013.01); *H04B 17/318* (2015.01); *H04L 1/0002* (2013.01); *H04L 27/10* (2013.01); *H04M 1/72527* (2013.01); *H04W 4/80* (2018.02); *H04W 52/245* (2013.01); *H04W 64/00* (2013.01); *H04W 76/14* (2018.02); *H04B 2001/6912* (2013.01); *H04W 88/04* (2013.01)

(58) Field of Classification Search
CPC ... H04W 76/023; H04W 76/14; H04W 88/04; H04W 88/06; H04W 28/22; H04W 40/00; H04W 84/18; H04B 1/0003; H04B 1/006; H04B 1/3883; H04B 1/3888; H04B 1/48; H04B 1/69; H04B 17/318; H04B 2001/6912; H04L 1/0002; H04L 27/10; H04L 12/5692; H04L 1/18; H04M 1/72527

See application file for complete search history.

(56) References Cited

U.S. PATENT DOCUMENTS

| | | | |
|---|---|---|---|
| 6,295,460 B1 * | 9/2001 | Nagel | H04M 11/06 455/557 |
| 6,351,638 B1 | 2/2002 | Robinson | |
| 6,718,182 B1 * | 4/2004 | Kung | H04M 1/72527 455/344 |
| 7,151,764 B1 * | 12/2006 | Heinonen | H04W 48/08 370/338 |
| 8,407,759 B1 * | 3/2013 | Sotos | H04L 69/14 370/328 |
| 8,825,124 B1 | 9/2014 | Davies et al. | |
| 8,841,993 B2 * | 9/2014 | Aunkofer | B60C 23/0418 340/426.16 |
| 9,503,898 B2 * | 11/2016 | Kleidermacher | H04W 12/08 |
| 9,614,573 B2 * | 4/2017 | Ames | H04M 1/03 |
| 9,667,804 B1 * | 5/2017 | Hall | H04M 11/007 |
| 2002/0146067 A1 * | 10/2002 | Brassil | H04L 12/5692 375/219 |
| 2003/0224738 A1 | 12/2003 | Harano | |
| 2009/0131044 A1 | 5/2009 | Marini et al. | |
| 2009/0189981 A1 * | 7/2009 | Siann | H04N 7/183 348/143 |
| 2009/0204265 A1 * | 8/2009 | Hackett | G05B 19/4185 700/284 |
| 2009/0248913 A1 * | 10/2009 | Salokannel | G06F 13/385 710/33 |
| 2011/0187527 A1 * | 8/2011 | Goodwill | G08B 1/08 340/539.13 |
| 2011/0191484 A1 * | 8/2011 | Babbar | G06F 9/5011 709/228 |
| 2014/0018125 A1 * | 1/2014 | Shoshan | H04W 4/00 455/550.1 |
| 2014/0087722 A1 | 3/2014 | Brittain et al. | |
| 2015/0039269 A1 * | 2/2015 | Mejegard | G06Q 10/06 702/182 |
| 2015/0208320 A1 * | 7/2015 | Alexander | H04W 40/246 370/254 |
| 2015/0264627 A1 * | 9/2015 | Perdomo | H04W 40/12 370/329 |
| 2016/0094269 A1 * | 3/2016 | Seller | H04B 1/69 375/139 |
| 2016/0142177 A1 * | 5/2016 | Chou | H04L 1/0005 370/329 |
| 2016/0234873 A1 * | 8/2016 | Ryu | H04W 76/14 |
| 2016/0345265 A1 * | 11/2016 | Lee | H04W 52/0235 |
| 2017/0019144 A1 * | 1/2017 | Malach | H04W 4/80 |
| 2017/0150315 A1 * | 5/2017 | Lee | H04W 4/029 |
| 2017/0163685 A1 * | 6/2017 | Schwartz | H04L 63/20 |
| 2017/0164365 A1 * | 6/2017 | DeCoster | H04W 4/80 |
| 2017/0230074 A1 * | 8/2017 | Rose | H04B 1/44 |
| 2017/0230793 A1 * | 8/2017 | Sugiyama | H04W 4/023 |
| 2017/0272842 A1 * | 9/2017 | Touma | G08C 17/02 |
| 2018/0024828 A1 * | 1/2018 | Nogueira-Nine | G06F 8/654 717/173 |
| 2018/0220373 A1 * | 8/2018 | Arzelier | H04W 4/027 |

* cited by examiner

EXAMPLE OF DUAL BAND RADIO SYSTEM

LONG-RANGE VOICE AND DATA TRANSMISSION USING LORA MODULATION AND SENSITIVITY-ENHANCING BUFFERING TECHNIQUES

CROSS REFERENCE TO RELATED APPLICATION

This application claims benefit of U.S. Provisional Application No. 62/302,086, filed Mar. 1, 2016, entitled LONG-RANGE VOICE AND DATA TRANSMISSION USING LORA MODULATION AND SENSITIVITY-ENHANCING BUFFERING TECHNIQUES, and is also a Continuation-in-Part of U.S. patent application Ser. No. 15/436,405, filed Feb. 17, 2017, entitled COUPLING OF RADIO HARDWARE WITH A MOBILE DEVICE ACTING AS A SOFTWARE DEFINED RADIO, which is a Continuation of U.S. patent application Ser. No. 14/645,171, filed Mar. 11, 2015, entitled COUPLING OF RADIO HARDWARE WITH A MOBILE DEVICE ACTING AS A SOFTWARE DEFINED RADIO, which claims the benefit of U.S. Provisional Application No. 61/951,953 filed Mar. 12, 2014, entitled COUPLING OF RADIO HARDWARE WITH A MOBILE DEVICE ACTING AS A SOFTWARE DEFINED RADIO, filed Mar. 12, 2014. All of the above are incorporated herein by reference, in their entirety.

FIELD

The present disclosure relates to device-to-device voice and data transmission and more specifically to voice over LoRa.

BACKGROUND

The effective range of device-to-device voice and data transmission is affected by many factors including transmit power, antenna characteristics, receiver sensitivity and system cost. Range limitations define the usable coverage area for radio communications with greater range generally equating to better user experience. As the range of a radio system decreases, so too does its usability, adoption, and commercial viability.

Present solutions to the problem of range limitations in wireless voice and data communications typically include increasing the transmit power, increasing the gain of the transmit and/or receive antenna, and leveraging low-noise architectures to increase receiver sensitivity. In mobile applications, increasing the gain of the antenna is not always possible due to form-factor constraints. As mobile applications are frequently power-constrained, increasing the transmit power results in perceptibly reduced battery life, to the detriment of device longevity and user experience. There are regulatory limits to the maximum allowable transmit power, so arbitrarily increasing the transmit power to achieve greater range is not considered a viable solution.

Present solutions optimize singularly for range, seeking to maximize the range without consideration for how functionality can be adapted to best suit varying operating conditions. This fails to recognize that multiple operating modes can be utilized to provide the best overall user experience. Accordingly, there is a need for improved technologies to support radio communication over extended ranges and poor conditions, consistent with battery and power constraints of portable devices, and without compromising performance in favorable or intermediate conditions.

SUMMARY

In summary, the detailed description presents innovations in the art of wireless communication to/from a mobile device and between mobile devices, providing a greatly extended communication range without compromising full-featured performance at short distances, while respecting the battery life constraints that are critical for mobile devices.

In a first aspect, a long-range radio device is disclosed that provides two or more radios for uni- or bi-directional communication under varying conditions. In examples, a LoRa radio is provided for intermediate-range to long-range and low-data rate operation, and an FSK radio is provided for short- to intermediate-range and higher maximum data rates. The long-range radio device can be operated as an adjunct to another communication or computing device such as a smartphone.

In a second aspect, a software control application is provided for a host device such as a smartphone to interface with and control the long-range radio device. The software control application can be embodied in a non-transitory computer-readable medium, or can be embodied in a host device such as a smartphone. The software control application is operable to interface with existing apps on the host device, a GPS or location/satnav device on the host device, a local interface such as Bluetooth. The software control application can be provided together with a encoder/decoder/compressor/decompressor subsystem for processing voice and other data.

In another aspect, a system is described combining the long-range radio device, the host software control application, and other optional host modules. In a fourth aspect, a radio link is described comprising two such systems.

In another aspect, methods of operation is provided including transmit-side and receive-side operation, including LoRa and FSK or other radio signaling, and including voice, other audio, video, and other data types.

In another aspect, methods are provided to utilize one or more of a variety of inputs to determine and switch between operating modes of the aforementioned communication system. These inputs can include received signal strength readings, and GPS or another location-finding or satnav subsystem. Besides switching between FSK and LoRa radios, the LoRa operating mode can be controlled, and the data rate, compression parameters, and associated buffering can be controlled.

The disclosed embodiments have other advantages and features which will be more readily apparent from the detailed description, the appended claims, and the accompanying figures (or drawings). A brief introduction of the figures follows.

BRIEF DESCRIPTION OF THE DRAWINGS

The Figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable, similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

DETAILED DESCRIPTION

Figure 1:
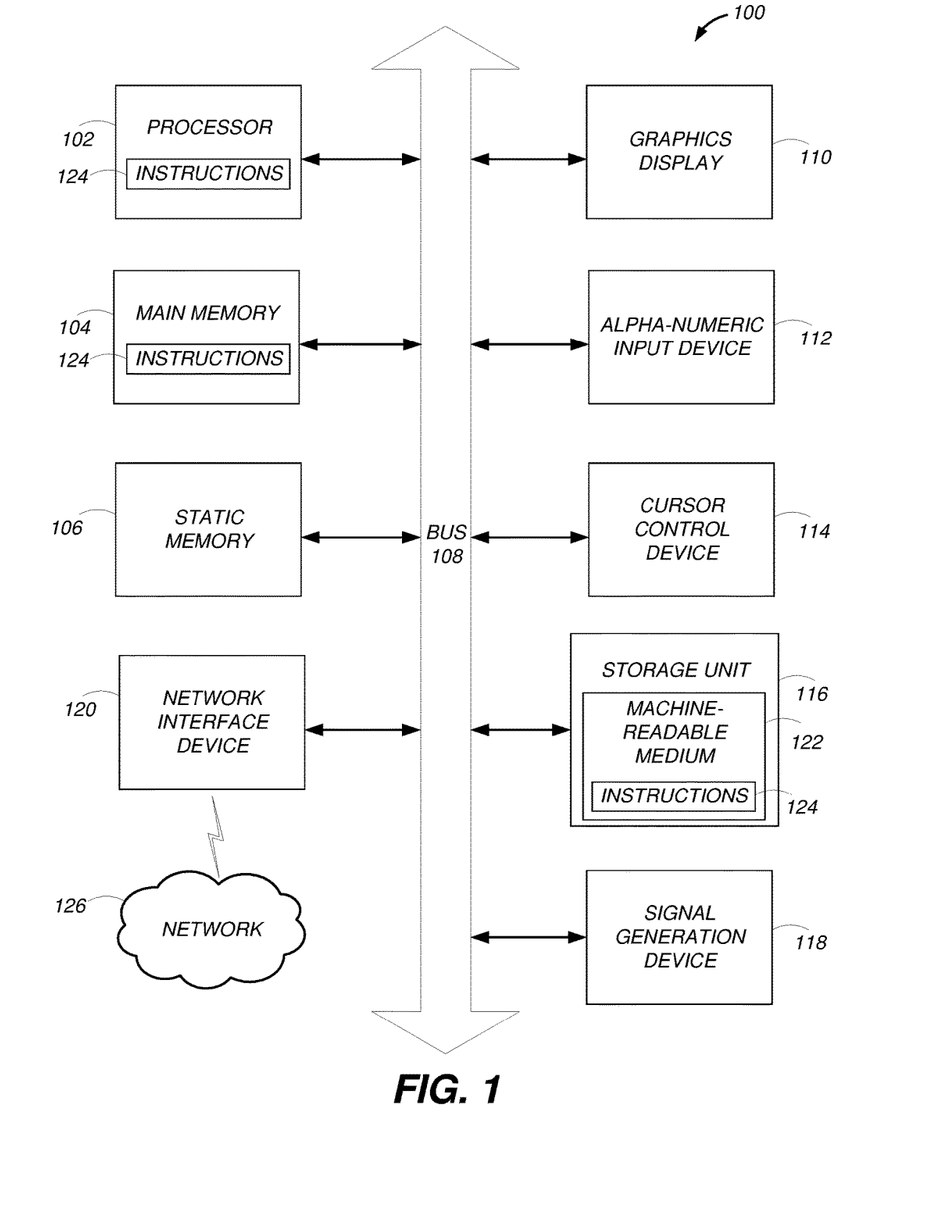
FIG. 1 illustrates one embodiment of components of an example machine able to read instructions from a machine-readable medium and execute them in a processor (or controller).

FIG. 1 and the following description relate to preferred embodiments by way of illustration only. It should be noted that from the following discussion, alternative embodiments of the structures and methods disclosed herein will be readily recognized as viable alternatives that may be employed without departing from the principles of the embodiments.

Reference will now be made in detail to several embodiments, examples of which are illustrated in the accompanying figures. It is noted that wherever practicable, similar or like reference numbers may be used in the figures and may indicate similar or like functionality. The figures depict embodiments for purposes of illustration only. One skilled in the art will readily recognize from the following description that alternative embodiments of the structures and methods illustrated herein may be employed without departing from the principles described herein.

Configuration Overview

Embodiments of a disclosed system, method, and computer readable storage medium enable communication between mobile devices, or between a mobile device and a fixed station. In some embodiments, a control application on a smartphone controls a proximate long-range radio device supporting two radio standards, one of which is a long-range or low-power technology such as LoRa. The control application receives voice or data from an interface or app of the smartphone, and forwards the voice or data after processing to the long-range radio device for encoding and transmission to a remote radio station.

In some embodiments, the remote receiving radio station is substantially similar to the transmitting station. A received radio signal is decoded and forwarded to a smartphone, where a control app processes the received signal and delivers the received signal to an app or interface on the remote smartphone, thus completing the communication path. Information can similarly be transmitted in the reverse direction from the remote station to the local station.

The control app can switch between a long-range/low-power radio and higher data rate radio as one or both stations move, or conditions change for other reasons.

Computing Machine Architecture

FIG. 1 is a block diagram illustrating components of an example machine able to read instructions from a machine-readable medium and execute them in a processor (or controller). Specifically, FIG. 1 shows a diagrammatic representation of a machine in the example form of a computer system 100 within which instructions 124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 124 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 100 includes a processor 102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 104, and a static memory 106, which are configured to communicate with each other via a bus 108. The computer system 100 may further include graphics display unit 110 (e.g., a plasma display panel (PDP), a liquid crystal display (LCD), a projector, or a cathode ray tube (CRT), a light-emitting diode display (LED), an organic light-emitting diode display (OLED), a quantum diode light-emitting diode display (QD-LED), or an electrophoretic display). The computer system 100 may also include alphanumeric input device 112 (e.g., a keyboard), a cursor control device 114 (e.g., a mouse, a trackball, a joystick, a motion sensor, or other pointing instrument), a storage unit 116, a signal generation device 118 (e.g., a speaker), and a network interface device 820, which also are configured to communicate via the bus 108.

The storage unit 116 includes a non-transitory machine-readable medium 122 on which is stored instructions 124 (e.g., software) embodying any one or more of the methodologies or functions described herein. The instructions 124 (e.g., software) may also reside, completely or at least partially, within the main memory 104 or within the processor 102 (e.g., within a processor's cache memory) during execution thereof by the computer system 100, the main memory 104 and the processor 102 also constituting machine-readable media. The instructions 124 (e.g., software) may be transmitted or received over a network 126 via the network interface device 120.

While machine-readable medium 122 is shown in an example embodiment to be a single medium, the term "machine-readable medium" should be taken to include a single medium or multiple media (e.g., a centralized or distributed database, or associated caches and servers) able to store instructions (e.g., instructions 124). The term "machine-readable medium" shall also be taken to include any medium that is capable of storing instructions (e.g., instructions 124) for execution by the machine and that cause the machine to perform any one or more of the methodologies disclosed herein. The term "machine-readable medium" includes, but not be limited to, data repositories in the form of solid-state memories, optical media, and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks. The term computer-readable storage media does not include signals and carrier waves. The term computer-readable storage media can refer to non-transitory storage media. In addition, the term computer-readable storage media does not include communication ports.

Long-Range Voice And Data Transmission

Example embodiments relate to sending (or transmitting) compressed or uncompressed voice and data using a combination of Frequency-Shift Keying (FSK), Long Range (LoRa) modulation and intelligent buffering. FSK and LoRa modems are functionally similar, but differ markedly in performance. FSK is a comparatively unencumbered modulation scheme. LoRa realizes lower maximum data rates owing to the degree to which the transmit spectrum is spread. The LoRa architecture allows a lower-cost and lower-power device in a smaller form factor to send voice and data over longer ranges. In some examples, bands near 900 MHz can be used, while in other examples, disclosed technology can be adapted for use on other frequency bands, including, but not limited to, VHF and UHF bands, or other bands such as 10 MHz-88 MHz, 88 MHz-108 MHz, 108 MHz-500 MHz, 500 MHz-900 MHz, 900 MHz-1 GHz, 1 GHz-2.4 GHz, 2.4 GHz-2.5 GHz, 2.5 GHz-5 GHz, 5 GHz-6 GHz, 6 GHz-10 GHz, or 10 GHz-100 GHz.

Example System Architecture

Figure 2:
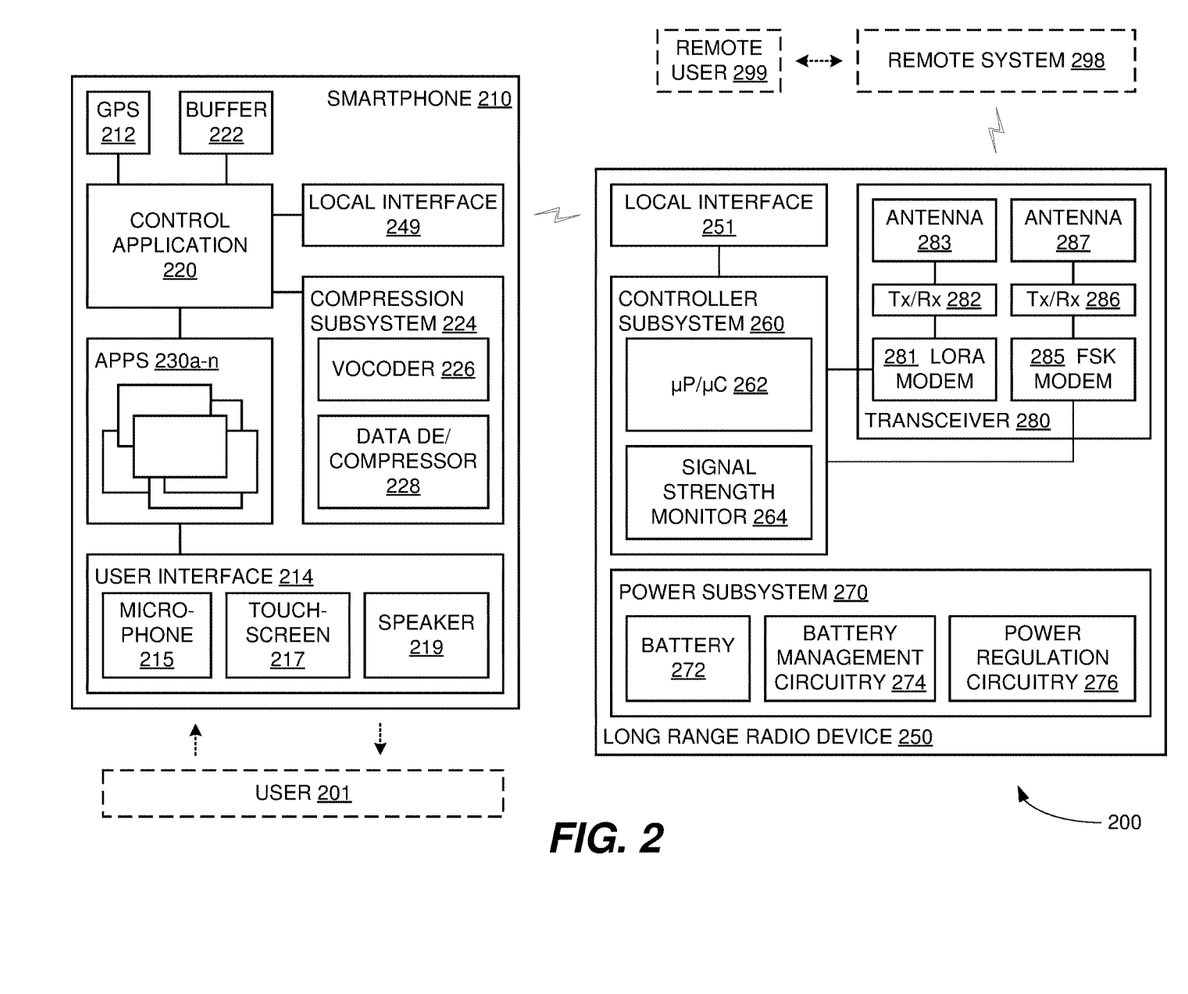
FIG. 2 illustrates an example system according to the disclosed technologies.

FIG. 2 illustrates an example system 200 according to the disclosed technologies. This example embodiment includes an application 220 hosted on a smartphone 210 and operable to control system operation, and a long-range radio device 250 housing the radio system along with device subsystems to support the configuration and operation of the radio 250.

An example of a smartphone computing architecture (in part or whole) is described with FIG. 1 and the corresponding computer system 100. In some embodiments, certain components depicted as hosted within smartphone 210 can be incorporated within long-range radio device 250 and vice versa. Also included in smartphone 210 are a positioning subsystem 212, a local interface 249, and a user interface 214 comprising microphone 215, touchscreen 217, and speaker 219. The positioning subsystem 212 can be a GPS block 212 as depicted, or an alternative such as GLONASS, Galileo, Beidou, Compass, Doris, IRNSS, or QZSS. One of ordinary skill will also appreciate that microphone 215 and speaker 219 can be implemented as stereo or array devices using amplifiers and transducers integrated within smartphone 210 or housed externally, for example in a headset (not shown). Similarly, touchscreen 217 can be implemented or augmented by a keypad, a keyboard, buttons, an external display including goggles or an augmented reality display, or annunciators. The smartphone 210 can host a variety of applications ("apps") 230a-n that can process, generate, or receive voice or other data. Such apps can include messaging apps, phone apps, camera and imaging apps, entertainment apps, financial apps, location apps, mapping apps, medical apps, security apps, sensing apps, storage apps, video apps, or other services. Smartphone 210 also hosts compression subsystem 224, which can include vocoder block 224 for compressing or decompressing voice or audio data, and a data de/compressor block 226 for compressing or decompressing other types of data. Compression subsystem can include a range of encoders/decoders suitable for different signal types. One of ordinary skill will appreciate that compression/decompression capabilities can additionally or alternatively be built-in to any one or more of apps 230a-n.

Turning to the long range radio device 250 in FIG. 2, among included device subsystems are an interface 251 to the smartphone 210, a controller subsystem 260 incorporating a local microprocessor or microcontroller 262 and a signal strength monitor 264, a transceiver subsystem including modems 281 and 285, and a power subsystem 270 incorporating a battery 272, battery management circuitry 274, and power regulation circuitry 276. Long-range radio device 250 communicates with smartphone 210 using a dedicated connection between local interface 251 and a corresponding interface 249 on the smartphone 210. The connection between the smartphone 210 and long-range radio device 250 may be wired or wireless and use any protocol or standard with sufficient bandwidth for transmitting voice, data and command/control instructions. In one example embodiment, a Bluetooth Classic interface is used to connect the smartphone 210 and the device 250.

In addition to the microprocessor or microcontroller 262 shown, the controller subsystem 260 can incorporate an architecture similar to architecture 100 shown in FIG. 1, including any one or more of the components shown in FIG. 1. Also shown in FIG. 2 is a signal strength monitor 264, which can provide an indication of received signal strength, which in turn can be used to make a determination to switch between FSK and LoRa communication. One of ordinary skill will appreciate that signal strength monitor 264 depicted as part of the controller subsystem 260 can be incorporated within transceiver subsystem 280, or can be distributed between these two subsystems. The controller subsystem 260 receives commands and data from control application 220 via the local connection between local interfaces 249, 251. Commands are acted upon and/or responded to as appropriate for each command; data is forwarded to transceiver subsystem 280 for transmission to a remote system 298. The controller subsystem 260 forwards data received from the remote system 298 via transceiver 280 to control application 220 over the same local connection. The controller subsystem 260 also reports and responds to the control application 220 over the local connection.

In addition to LoRa modem 281 and FSK modem 285, the transceiver subsystem 280 includes transmit/receive signal chains (comprising components such as one or more of amplifiers, filters, transducers, mixers, up-converters, down-converters) 282, 286, and antennae 283, 286. Although the radio components are shown as separate for the LoRa and FSK radio signal paths, one of ordinary skill will appreciate that one or more components can be shared between these signal paths. For example, the modems 281, 285 can be fabricated on the same silicon die and can even share circuit blocks. For example, through the use of wideband or multi-band RF or microwave components, antennae or signal chain components can also be shared between LoRa or FSK signal paths. One of ordinary skill will further appreciate that the discussion above is not limited to LoRa and FSK: in embodiments using additional or alternative radio technologies or standards, all of the above considerations are applicable.

Control application 220 running on the host smartphone 210 configures the operating parameters of the radio device 250, acquires the voice or text data that is to be transmitted by a user 201, optionally compresses it using a vocoder (voice) 226 or general-purpose compression block (data) 228, and controls display or playback of received data and voice transmissions for the user 201. The smartphone application 220 enables the buffering of voice and data in low-bandwidth operating modes as it has access to sufficient storage in buffer 222 to record and slowly transmit large messages. Furthermore, the smartphone control application 220 allows for changes to the vocoder 226, data compression block 228, protocol, and modulation schemes through configuration of application 220, or by a software update to an application (such as the control application 220, the compression subsystem 224, the local interface 249, or another module) on the smartphone 210.

Configuration of the radio device 250 can include: configuring the receive mode of the radio (e.g. frequencies used, demodulation scheme used, scanning capabilities or single frequency use, etc.); configuring the transmit mode of the radio (e.g. frequencies used, modulation scheme used, whether transmitting is allowed, etc.); determining what types of filtering are used for signal processing (both radio frequency and audio frequency and other relevant signal enhancement), determining what type of interference mode is utilized (e.g. error correction method for spread spectrum techniques, identification of cooperating radios, etc.); determining signal detection functionalities (similar to filtering, but often incorporating more complex analyses); generating power adjustment methods (e.g. adapting signal strength relevant to atmospheric conditions or proximity of the second radio communication device); determining appropriate battery mode (e.g. specifying how the radio device power subsystem 270 is managed in conjunction with the power needs of radio device 250); determining appropriate antenna mode (e.g. antenna selection, pre-amplification, etc.); and other configurable or controllable aspects of radio communication.

Example Use of Dual Radios

The system described herein provides increased voice and data range primarily through improved receiver sensitivity. Receiver sensitivity is improved relative to other radio systems by use of a LoRa modulation technique and by reduced digital data rate. The maximum bit rate of an RF channel is proportional to the bandwidth of the modulated spectrum. Spreading the spectrum enables detection at a lower signal-to-noise ratio (SNR). The sensitivity of a radio receiver is directly proportional to the minimum SNR, so as this minimum SNR decreases so too does the numerical value of sensitivity (where a lower number corresponds to better performance).

Figure 3:
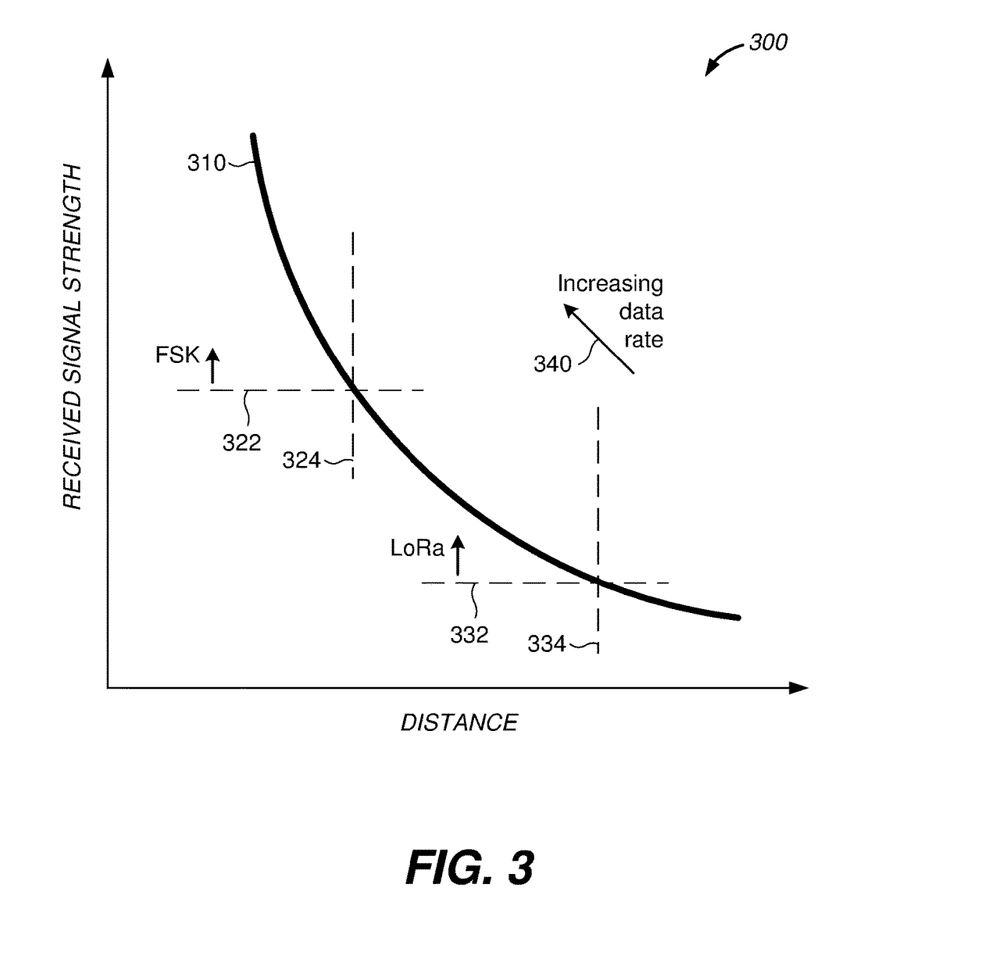
FIG. 3 illustrates a relationship between distance and received signal strength.

FIG. 3 depicts a graph 300 showing a relationship 310 between distance (plotted on the horizontal axis in FIG. 3) and received signal strength (plotted on the vertical axis). Distance represents a line-of-sight distance from a transmitter, such as remote system 298 and a receiver such as in long distance radio device 250. The transmitter power and channel conditions are presumed to be unvarying along the curve 310. Under some conditions, received signal power varies as $1/D^2$, where D is the abovementioned distance. Operating conditions for FSK and LoRa radios are indicated on the graph 300 as follows. FSK radio sensitivity is indicated by horizontal line 322, and indicates the minimum signal strength required for signal reception at a specified maximum bit error rate (BER) which can be $10^{-3}$, $10^{-6}$, 10, $10^{-12}$, or any other value or sub-range within $10^{-1}$-$10^{-15}$; the maximum BER can be specified on the raw signal or after processing with e.g. error-correcting codes. Generally, the FSK radio can be successfully operated at signal strengths greater than or equal to the sensitivity line 322, as indicated by the arrow "FSK." This operating region also corresponds to distances less than or equal to a maximum FSK range shown by vertical line 324. Similarly, LoRa radio sensitivity is indicated by horizontal line 332, and indicates the minimum signal strength required for signal reception at a maximum bit error rate specified in similar manner as for the FSK radio. Thus, the LoRa radio can be operated at signal strengths greater than or equal to the sensitivity line 332, as indicated by the arrow "LoRa." This operating region also corresponds to distances less than or equal to a maximum LoRa range shown by vertical line 334.

One of ordinary skill will appreciate that higher data rates are possible for greater signal strengths; this is indicated on the graph 300 by arrow 340. Furthermore, the sensitivity lines 322, 332 are also data rate dependent; sensitivity can be lowered (improved) for lower data rates as described elsewhere herein.

Turning back to FIG. 2, the long-range radio device 250 of system 200 includes both FSK and LoRa modems. In one embodiment, the LoRa modem 281 and FSK modem 285 reside on the same silicon and are selectable at runtime. The LoRa modulation technique uses a combination of chirp spread spectrum (CSS) and direct sequence spread spectrum (DSSS) to enable reception of signals of very low signal-to-noise ratio (sub-unity). Digital data rate reductions are achieved through the use of various compression techniques or through the introduction of latency to the transmission process. One byproduct of reducing the amount of data to be sent through the use of compression is that the data can be transmitted more slowly. Reducing the amount of data allows more reliable detection of weak signals by the receiver. If the data rates are slower than the data rates for real-time voice transmission, the audio may not be played back as it is received. A buffering process is used to store the voice message on the transmitting system, transmit it slowly to the other device over the RF channel, and play it back once the entire message has been received.

The disclosed technique accounts for variability in link quality caused by many factors, most notably users moving closer to, or further away from one another. Existing technologies present with a static solution conceding that the performance of the radio system is fixed by the operating environment. By including both LoRa and FSK, enhanced user experience and greater functionality is provided by adapting the modulation scheme and data rates to optimally suit current conditions. Functionality is selectively enabled or disabled based on observed operating conditions in order to provide higher performance. For example, if users are in close proximity, the users may negotiate a transition from LoRa to FSK to enable high-bandwidth data transfer, switching back to LoRa modulation when the transfer is complete. If users are near or beyond the limits of the FSK radio, operation remains on LoRa and data rates scale in inverse proportion to distance of separation. When data rates are sufficiently reduced to preclude real-time voice operation, the application transitions from real-time to buffered mode wherein latency is intentionally introduced to allow continued communication.

Two methods for estimating range are used: direct observation using shared geolocation data and estimation based on received signal strength. Each of the example method may be executed on a machine, for example, the computer system 100 described in FIG. 1. The methods may be embodied as software. The software may be referenced as computer program code or code segments and may be comprised of one or more instructions, e.g., instructions 124.

Continuing with the method, the received signal strength is directly measurable by the radio receiver, and decreases with increasing range. Since environmental factors other than range can affect the received signal strength, the received signal strength is used as a proxy for range. Operating mode adjustments are made regardless of what specific factor affects the received signal strength. Based on the range estimation, a modulation scheme is chosen. The range thresholds used for determining modulation configuration and other radio parameters are programmable. As transmit power and other important factors directly or indirectly affecting received signal strength may vary, with temperature for example, it is desirable to be able to modify these thresholds in situ. Thus the functionality of the system is scaled in response to a changing operating environment. Although voice data, text message data, and geolocation data are disclosed herein, any data of interest that is compatible with data throughput constraints can be accommodated.

Alternatively or additionally, thresholds can be implemented directly on the received signal strength. Thresholds can be implemented with hysteresis, so that a threshold (distance, or received power) for transitioning to a LoRa radio can be set to a different value than for a reverse transition to a FSK radio.

The radio parameters that are configured by the smartphone application 220 include transmit power, center frequency, frequency hop sequencing, bandwidth, spreading factor, etc. The complete set of configurable parameters will be specific to each different radio integrated circuit.

Example Operating Method

Figure 4:
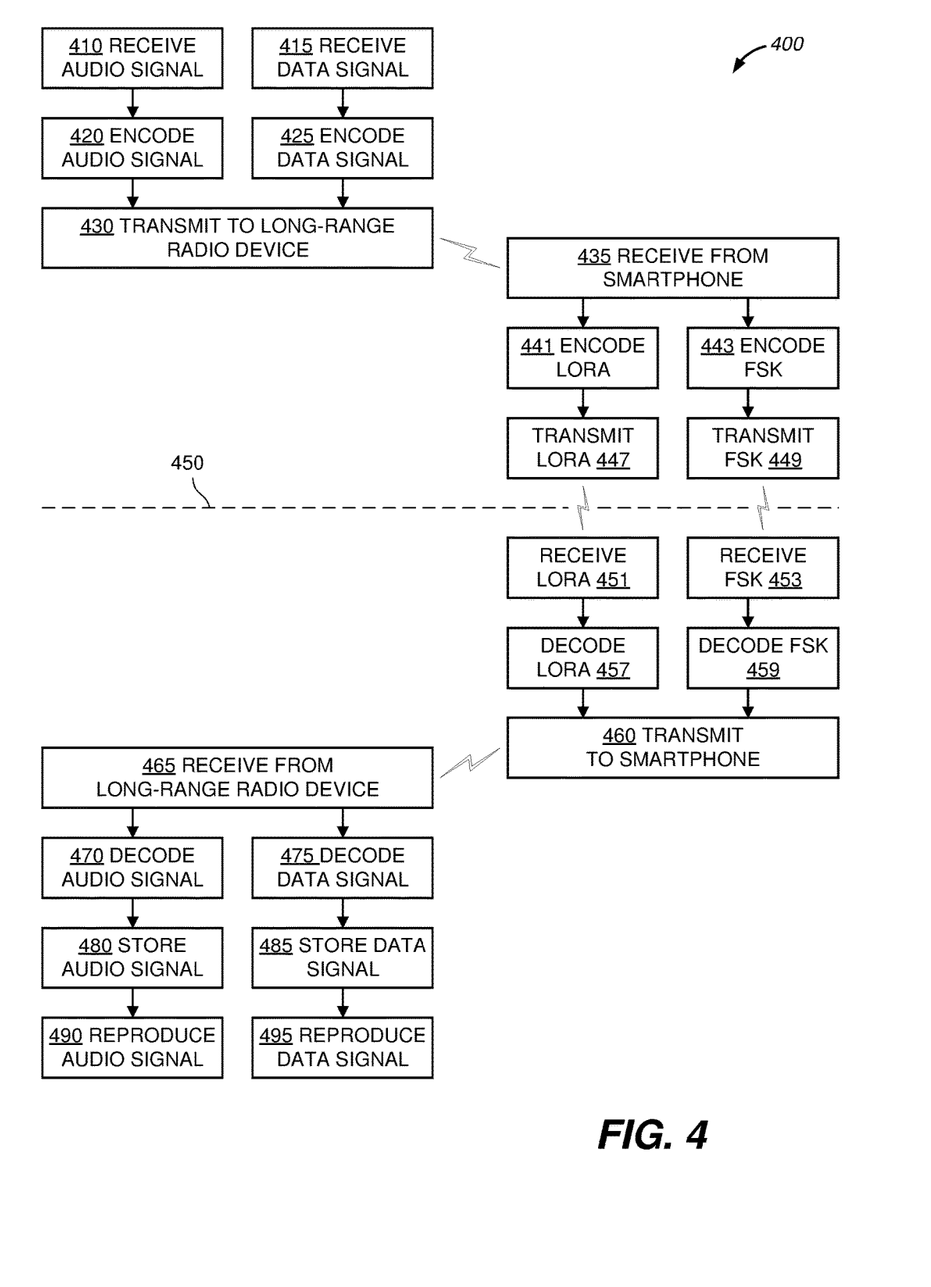
FIG. 4 illustrates a flowchart for operating methods according to the disclosed technologies.

FIG. 4 illustrates a flowchart 400 for operating methods according to the disclosed technologies. The operating flow of the system is described as follows with additional reference to FIG. 2. The left-hand side of flowchart 400 represents process blocks performed by control application 220, with separate columns for audio signal flow (including voice) and data signal flow. The right-hand side of flowchart 400 represents process blocks performed by long-range radio device 250, with separate columns for LoRa signaling and FSK signaling. Additionally, dashed line 450 separates a transmitting system (above the line 450) from a receiving system (below the line 450). In this way, flowchart 400 depicts several distinct operations flows.

A user 201 speaks into the microphone 215 on the smartphone 210 (or into an attached headset, not shown) and the voice signal is digitized and received at 410 by control application 210. The digitized voice signal is encoded and/or compressed (420) by software in the vocoder block 226 resulting in a substantial reduction in signal bandwidth. The compressed voice signal is packetized within the framework of a custom protocol for transmission (430) to the radio device. This transmission is enabled by a Bluetooth connection between local interface 249 on the smartphone 200 and corresponding local interface 251 on the radio device 250. Upon reception at the long-range radio device 250, the local control microprocessor 262 within the radio device 250 processes the packet according to the aforementioned protocol and relays the voice data to the radio transceiver 280 for transmission. As described herein, either a LoRa radio or an FSK radio can be used according to the operating conditions and control logic. When the LoRa radio is selected, the data is encoded (441) in a LoRa modem 281, processed through Tx signal chain 282, and transmitted (447) via antenna 283. Similarly, when the FSK radio is selected, the data is encoded (443) in a LoRa modem 285, processed through Tx signal chain 286, and transmitted (449) via antenna 287.

The process works in reverse for the reception of voice signals. Here a remote receiving system 298 will be described having similar structure 200 as the transmitting system at which process blocks 410-449 are performed; one of ordinary skill will appreciate that the same reference numbers are used for description solely for purpose of illustration, and that in typical embodiments, the receiving system and the transmitting system are distinct.

According to operating mode, LoRa signals are received (451) at antenna 283, processed through Rx signal chain 282 and decoded in LoRa decoder 281 to reach controller subsystem 260 of a receiving radio device 250. Alternatively, FSK signals are received (453) at antenna 287, processed through Rx signal chain 286 and decoded in LoRa decoder 285 to reach the controller subsystem 260. The local microprocessor 262 packages data or audio (including voice) received by the radio transceiver 280 and transmits (460) the packaged data to the smartphone application 220 using the Bluetooth connection between local interfaces 251 and 249. Upon reception (465) at the smartphone, the data is processed according to the type of application data that was received. Voice data is decoded (470) using vocoder block 226 to recreate the original voice message and reproduced or played (490) out the device speaker 219 (or attached headset, not shown) for the user 201 to hear. The voice message can optionally be stored (480) on the receiving smartphone 210. In cases where buffering is used, the buffering is implemented on the host smartphone 210 using buffer 222.

The operating flow of process blocks 410-490 has been described particularly with regard to a voice signal, which may also involve phone apps 230b or instant messaging apps 230c on both transmitting and receiving systems. An operating flow for other audio signals similarly follows process blocks 410-490, however the audio encoding/decoding can be performed by encoders/decoders that are not voice-specific. A wide range of audio encoders/decoders can be used, following lossy standards such as AAC, MP3, SBC, or Vorbis, or following lossless standards such as ALAC, APE, FLAC, TTA, or WMAL.

The operating flow of data signals is similar to that described for voice signals above. On the transmit side, the control application 220 receives a data signal at 415, which may be sourced from any app 230a-n, from the operating system of smartphone 210, or by the user's entry via touchscreen 217, another user input device, or from an externally attached storage device. At 420, the data signal is compressed by data compressor 228. The subsequent operating flow from process blocks 430-465 proceeds substantially similarly to that described above for voice signals, using either LoRa or FSK signal path according to the configuration and operating conditions. At process block 475, on a receiver smartphone 210, the data signal is decoded by decompressor 228, following which the data signal can be optionally stored (485) or reproduced (495). Reproduction of the data signal can take the form of text or graphical display on e.g. touchscreen 217. In some embodiments or configurations, the received data can be stored at 485 without decompression.

Geolocation data is provided by the GPS block 212 included in the operating system software. Voice encoding and compression is implemented in software or firmware, by vocoder block 226. In one embodiment, a G.729 vocoder algorithm is used. Received text messages are stored in the smartphone application and displayed on touchscreen 217. Received voice messages are able to be played in real-time when as they are received, and/or stored for playback later, at the user's convenience.

Additional Examples

Figure 5:
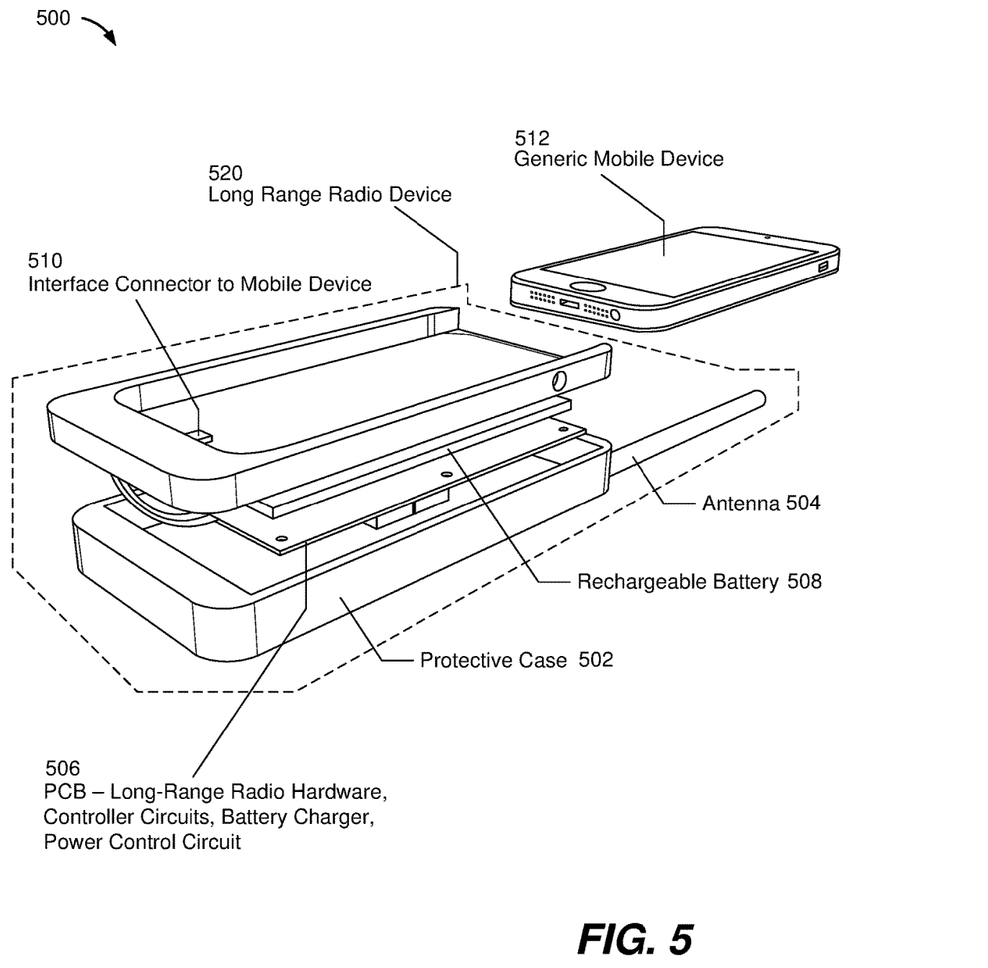
FIG. 5 is an exploded perspective view of a long range radio device able to be coupled with a mobile device according to the teachings of the present disclosure.

FIG. 5 is an exploded illustration 500 of an exemplary long-range radio device 520 operable in conjunction with a mobile device 512. A protective case 502 encloses components and, in some examples, can be configured to receive and releasably secure a mobile device 512. An antenna 504 is coupled to the protective case 502, which in certain embodiments may be fixed in an extended form from the case 502, while in other embodiments may be collapsible to reside within the case 502 when not in use and extended when in use. In other embodiments, the antenna 504 may be incorporated entirely within the case 502. Radio electronics or device 506 exist embedded within the case 502, and in some embodiments, a rechargeable battery 508 may further be embedded within the case 502. The radio electronics 506 embedded in the case 502 may include those illustrated in FIG. 2, for example a radio controller 260, transceiver 280, etc.

The protective case 502 allows the radio electronics 506 to communicatively couple with the mobile device 512 as previously noted, with some embodiments using a direct connection 510 as an interface to connect the mobile device 512 and radio electronics 406. The mobile device 512 and radio electronics 506 may be connected in a wired or a wireless configuration. In the wired configuration (illustrated in FIG. 5), the interface connector 510 includes an opening through which a connection such as a USB cord or the like may be threaded, the connection corresponding to a data port of the mobile device 506. Alternatively, the communication device 500 may include a port which connects directly with the data port of the mobile device. It should be noted that various makes and models of mobile devices 512 will have varying data port configurations, and the cases 502 and connectors 510 of the present disclosure may be configured and manufactured to accommodate those makes and models. In other embodiments, connector 510 is absent, and a long-range radio device similar to 520 is wireles sly coupled to mobile device 512. The wireless connection may be made using Bluetooth® technology, Wi-Fi, or other technology known in the art.

Thus, the complete protective case 502 is a single unit consisting of multiple assembled components which, in conjunction, allow for wireless or wired coupling of a mobile device to a long-range radio device. In some embodiments, mobile devices 512 for use with the case 502 can have unique dimensions, connection types, and connector locations, and as such each case 502 may have mobile device-specific configurations.

Figure 6:
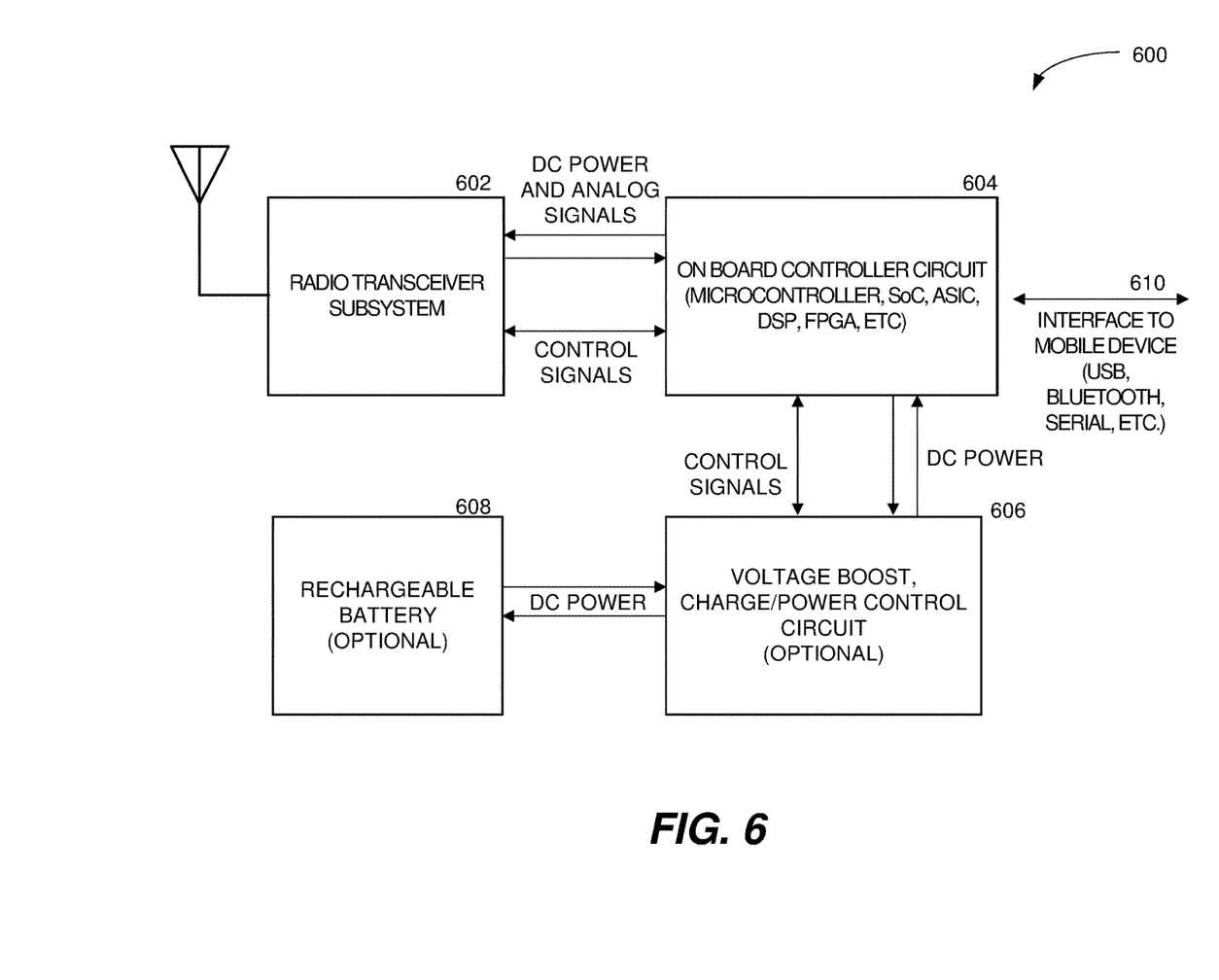
FIG. 6 is a block diagram of a representative embodiment of the electronic functional components necessary for a long range radio system.

FIG. 6 is a block diagram of a representative embodiment 600 of the electronic functional components necessary to interact with a long range radio system. An RF circuit 602 includes the circuitry necessary for long-range communication capabilities, as previously described. The RF circuit 602 interconnects to an onboard controller circuit 604 via DC power and analog signals as well as control signals, as indicated. The onboard controller circuit 604 can interconnect with voltage and power circuits 606, also via DC power and control signals as indicated. Finally, if a rechargeable battery 608 is further connected, it is interconnected with the voltage and charge system 606. These components are connected via the onboard controller 604 to the mobile device 610, which manifests the software component of the long-range radio.

Figure 7:
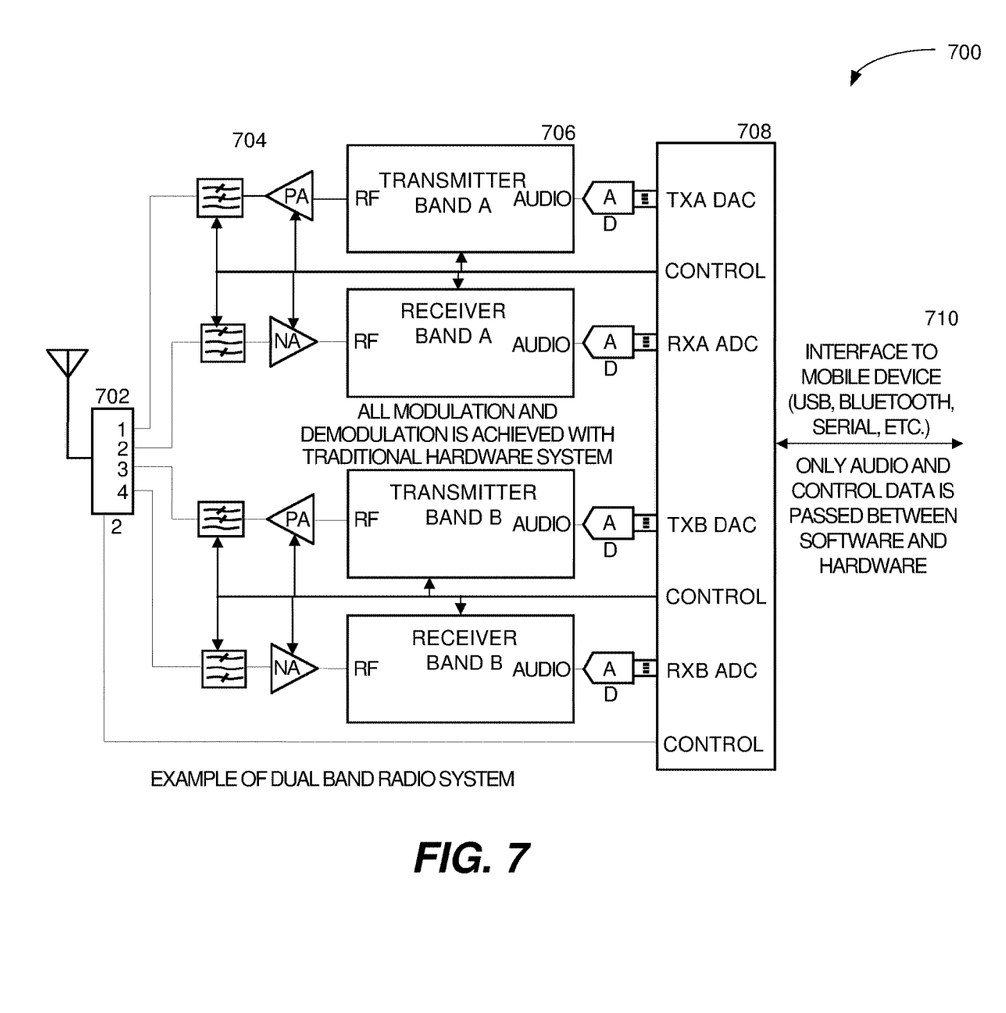
FIG. 7 is a block diagram of an example embodiment of a dual-band radio system.

FIG. 7 is a functional descriptive circuit diagram of one possible embodiment of a dual band long-range radio 700, which can be a software-defined radio. Component 702 represents the transmit-receive switching and various frequency band selection capabilities of the antenna. Components 704 are representative of the various filtering, amplification, and control circuits for sending and receiving radio signals. Components 706 show two transmitter and receiver bands, A and B, of which additional bands may be used as desired. Component 708 provides the software interface point for the various control and analog/digital conversions. This control point 708 interfaces with the mobile device 710, manifesting the software component of the long range radio system 700.

Additional Features

In some embodiments, two communicating stations are substantially similar; each station can be mobile, and can include a smartphone hosting a control app and having a variety of other apps and interfaces, together with a long-range radio device as described. Both stations can be capable of bidirectional communication. However, many other configurations can also be supported by the disclosed technologies. In examples, one station can be a fixed station, such as a base station, access point, or server. In examples, one station can be integrated, with control app and long-range radio integrated in a single housing. In examples, a mobile station can run its control app on a laptop, tablet, or other portable computing device, or on a computing device mounted on a vehicle. In examples, two communicating stations can be enabled for only unidirectional communication between control apps, with limited bidirectional link-layer signaling between the long-range radio units, for the purpose of negotiating connections and switching between radio standards. In examples, unidirectional signaling can be supported from a mobile station to a fixed station with no reverse communication at all: the mobile station can select between radio standards based on the distance between its location and the known location of the fixed station, while the fixed station can listen on both radio channels.

In some embodiments, a mobile station according to disclosed technologies can be powered by a battery, such as lithium-ion, lithium polymer, alkaline, nickel cadmium, nickel metal hydride, or lead-acid. However, battery power is not a requirement. A mobile station can be powered by solar power, a fuel cell, a thermoelectric generator, a portable fossil fuel generator, an energy harvester, or even a small sealed transportable autonomous reactor.

In some embodiments, communication between a smartphone or other host device and its associated long-range radio is performed using Bluetooth®, however other wired and wireless technologies can be used. Among wireless technologies, DECT, IEEE 802.11 (including a, b, g, n, y, ac, or ad clauses), IEEE 802.15, IrDA, Near Field Communication (NFC), Ultra Wideband, Wireless USB, or ZigBee standards can also be used. Among wired standards, Firewire, IEEE 802.3 (Ethernet family), IEEE 1901, Thunderbolt, or USB can be used. Optical technologies such as Li-Fi or IEEE 802.15.7 can also be used.

In embodiments, signals may be encoded and/or decoded multiple times over the communication path from a transmitting app at a first station to a receiving app at a second station. As described herein, the control app at a transmitting station can route a speech signal to a vocoder which can encode the signal to achieve compression and bandwidth reduction. Correspondingly, at a receiving station the control app can route a received signal to a vocoder to recover the speech signal. Data signals can similarly be compressed (and decompressed) by any of a variety of data compression function blocks. Thus, baseband encoding/decoding can be performed at a station, for example by a smartphone, for the purpose of compression/decompression. In embodiments, baseband coding can additionally or alternatively provide encryption/decryption. The baseband coding functionality can be dynamically varied according to selected radio, distance, received signal strength, remaining battery life, or other parameters.

As described herein, the long-range radio device can perform encoding on a signal to be transmitted according to a selected radio standard. In examples, the signal can be encoded using CSS for LoRa transmission, or using frequency-shift keying for FSK transmission. Thus, radio encoding/decoding can be performed at a long-range radio device for the purpose of modulation. In embodiments, encoding/decoding can also perform security functions, such as frequency-hopping, or signal spreading.

Additional signal encoding/decoding can also be performed, for example over a Bluetooth® or other local link.

In some embodiments, the location of a smartphone is obtained from a GPS module integrally incorporated within the smartphone. However, other location finders can be used with the disclosed technologies, including subsystems, modules, services, and/or auxiliary units using any satellite navigation (satnav) technologies reported herein, or other radio, celestial, inertial, or magnetic position finding technologies.

The present disclosure often refers to a mobile device or cellular telephone as a smartphone. It should be understood that the term smartphone encompasses other forms of mobile computing devices. A "mobile device" is any portable device normally utilized for communication, specifically not including any device with existing capabilities using LoRa modulation, as described for example in SemTech Application Note AN1200.22 dated May 2015. Such devices may include cellular telephones or any other device operable over the cellular telephone network, tablet computers, laptop computers, music players, and any other devices which can make use of the internet (either wired or wireless, such as Wi-Fi, WiMAX, LTE, etc.), or other similar devices normally utilized for communication and can contain a microphone and speaker or equivalent, e.g. via a plug-in or connectable via wireless technologies (e.g. Bluetooth®), and also capable of executing software. An exemplary smartphone is a mobile device which allows the user to modify the functionality to personalize the set of software applications which can be executed on the mobile device. Such applications may include a World Wide Web (WWW or web) browser, camera and video recording capabilities, tracking and logging software (e.g. vehicle mileage tracking), and global positioning software for location-finding, as well as multimedia applications for watching movies or listening to music. Further, the applications may include vendor-specific content, such as restaurant reviews or television programming. Practically any type of software application may be created for use on a smartphone.

Additional Configuration Considerations

Throughout this specification, plural instances may implement components, operations, or structures described as a single instance. Although individual operations of one or more methods are illustrated and described as separate operations, one or more of the individual operations may be performed concurrently. Additionally, the operations may be performed in an order other than the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically, and may be configured to perform certain operations either permanently or temporarily. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors (e.g., as described with FIG. 1) that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory as described with FIG. 1). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this regard.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of ordinary skill in the art will appreciate still additional alternative structural and functional designs through the disclosed principles of the embodiments. Thus, while particular embodiments and applications have been illustrated and described, it is to be understood that the embodiments are not limited to the precise construction and components disclosed herein. Various modifications, changes and variations which will be apparent to those skilled in the art may be made in the arrangement, operation and details of the method and apparatus disclosed herein without departing from the spirit and scope as defined in the appended claims.

We claim:

1. A system comprising:
    a long-range radio device comprising:
        a first long-range radio modem conforming to a LoRa modulation format;
        a second high data-rate radio modem;
        a first local interface; and
        a controller; and
    a control application executing on a host device having a second local interface;
    wherein the long-range radio device and the control application are operable to communicate over a link connecting the first and second local interfaces;
    wherein the control application is operable to control the long-range radio device;
    wherein the controller of the long-range radio device is operable to select the first radio modem responsive to a first command received from the control application, to select the second radio modem responsive to a second command received from the control application, and to communicate data between the first local interface and a selected one of the first and second radio modems; and
    wherein, with the first radio modem selected, the system is configured to communicate, over a LoRa modulated radio signal, voice data to and from the host device.

2. The system according to claim 1, wherein the second high data-rate modem employs frequency shift keying.

3. The system according to claim 1, wherein the link connecting the first and second local interfaces is a wireless link.

4. The system according to claim 3, wherein the wireless link is a Bluetooth® link.

5. The system according to claim 1, wherein the link connecting the first and second local interfaces is a wired link.

6. The system according to claim 1, wherein the host device is a smartphone.

7. The system according to claim 1, wherein the control application controls selection of the first or second radio modem at least partially based on a received signal strength indication.

8. The system according to claim 1, wherein the control application controls selection of the first or second radio modem at least partially based on a location reported by a location finder.

9. The system according to claim 1, wherein the control application controls at least one of:
    buffering,
    compression parameters,
    data rate, or
    transmit power.

10. An apparatus comprising two systems according to claim 1, configured to communicate with each other over their respective first long-range radio modems and over their respective second high data-rate radio modems.

11. A method for operating an extended range radio system having a long-range radio and a high data-rate radio for communicating with a remote station, comprising:
monitoring a signal indicating a distance between the extended range radio system and the remote station;
in at least a first case responsive to the signal corresponding to a decrease of the distance, selecting the high-data rate radio and deselecting the long-range radio; and
in at least a second case responsive to the signal corresponding to an increase of the distance, selecting the long-range radio and deselecting the high-data rate radio;
wherein the communicating is performed as a direct peer-to-peer link between the extended range radio system and the remote station.

12. The method of claim 11, wherein the monitored signal is a received signal strength.

13. The method of claim 11, wherein the monitored signal is a position determined by a location-finder.

14. The method of claim 11, further comprising:
subsequent to selecting the long-range radio, applying buffering to a voice communication.

15. A method for operating a radio system, comprising:
by a control application on a smartphone:
receiving a source signal comprising voice or data;
causing the source signal to be compressed;
transmitting the compressed signal over a local link to a transceiver comprising a first long-range radio and a second high-data rate radio supporting different respective wireless standards;
selecting one among the first and second radios; and
in a case with the first long-range radio selected, reducing a bandwidth required for radio transmission by causing the compressed source signal to be buffered, wherein the compressed source signal is recorded in a buffer for subsequent slow transmission by the first long-range radio using a LoRa modulation format; and
at the transceiver:
receiving the compressed signal over the local link;
forwarding the compressed signal to a selected one of the first or second radios; and
encoding and transmitting the compressed signal according to the wireless standard of the selected radio.

16. The method of claim 15, wherein the compression is performed according to parameters at least partly based on an allowable data rate of the radio system.

17. The method of claim 15, wherein the source signal is a voice signal.

18. The method of claim 15, wherein the first radio is a long-range radio, and, when the selected radio is the first radio, encoding comprises applying chirp spread spectrum (CSS) modulation.

19. The method of claim 15, further comprising:
at the transceiver:
receiving a second signal according to the wireless standard of the selected radio;
decoding the second signal; and
forwarding the decoded signal to the control application over the local link; and
by the control application on the smartphone:
receiving the decoded signal over the local link;
causing the decoded signal to be decompressed; and
forwarding the decompressed decoded signal to a destination,
wherein the destination is at least one of:
a storage module;
an interface of the smartphone; or
an app on the smartphone.

20. The method of claim 15, wherein the selecting is based on a position of the radio system determined by a location-finder.

* * * * *